United States Patent [19]

Anderson

[11] 4,291,584

[45] Sep. 29, 1981

[54] STALLED TURBINE FLOW METER

[75] Inventor: Eric G. Anderson, Rochester, Mich.

[73] Assignee: The Bendix Corporation, Southfield, Mich.

[21] Appl. No.: 86,912

[22] Filed: Oct. 22, 1979

[51] Int. Cl.³ .............................................. G01F 1/28
[52] U.S. Cl. ................................................ 73/861.72
[58] Field of Search ............ 73/861.04, 861.35, 861.71, 73/861.72

[56] References Cited

U.S. PATENT DOCUMENTS

| | | | |
|---|---|---|---|
| 2,422,762 | 6/1947 | Williams | 73/861.72 |
| 2,483,190 | 9/1949 | Evans | 73/861.72 |
| 2,714,310 | 8/1955 | Jennings | 73/861.36 |
| 3,241,367 | 3/1966 | Moss | 73/861.03 |
| 3,290,937 | 12/1966 | Matthews | 73/861.03 |
| 3,308,662 | 3/1967 | Maurer | 73/203 X |
| 3,407,657 | 10/1968 | Maurer | 73/861.03 |
| 3,807,229 | 4/1974 | Chiles | 73/203 |
| 3,943,891 | 3/1976 | Kinugawa | 73/861.75 X |

*Primary Examiner*—Herbert Goldstein
*Attorney, Agent, or Firm*—Russel C. Wells

[57] ABSTRACT

A turbine flow meter is disclosed of the type including a turbine rotor disposed in a fluid flow passage, the turbine receiving the fluid flow to be measured and mounted so as to restrain rotary movement in reaction to the change of momentum imposed on the fluid by the turbine rotor blades. A reactive force sensing arrangement measures the force acting on the turbine rotor blades and generates signals, related to the rate of fluid flow. These signals are combined with downstream pressure and temperature signals to provide a mass rate of flow output signal. The turbine rotor is disposed downstream from a shielding stator positioned such that upon increasing fluid flow and resultant advancing rotary position of the turbine rotor, a lesser proportion of the total fluid flow in the passage is intercepted by the turbine rotor. The net result is a linearizing of the relationship between the fluid flow and the reactive force acting on the turbine rotor. A coil spring acts to resist the rotary movement of the turbine rotor while silicone sleeve bearings are employed to damp the rotary motion of the turbine rotor.

1 Claim, 3 Drawing Figures

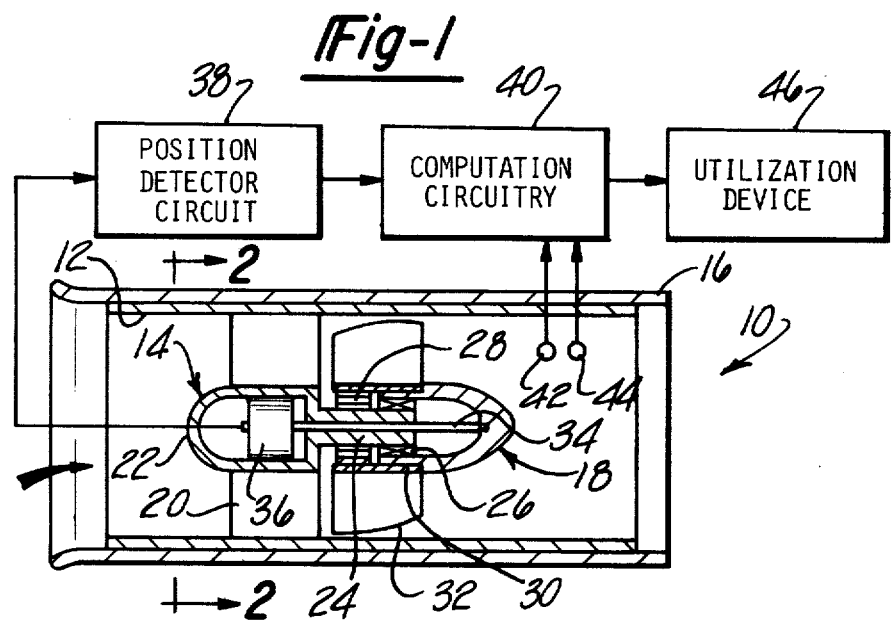
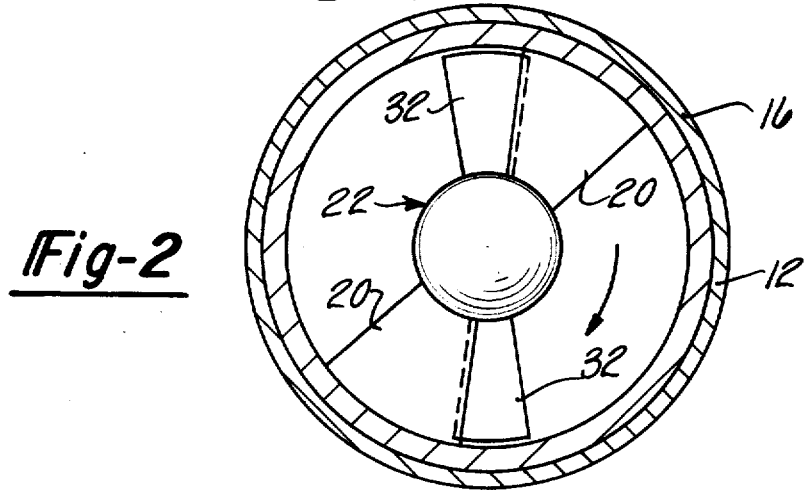
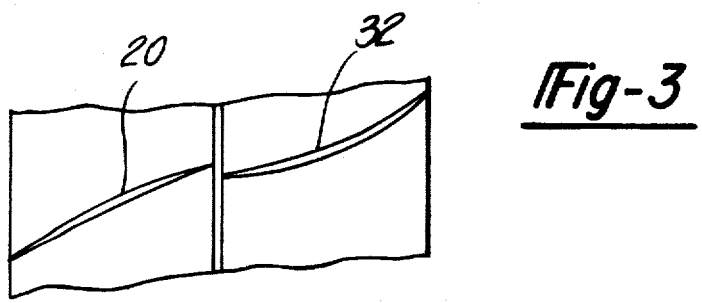

STALLED TURBINE FLOW METER

BACKGROUND DISCUSSION

A common approach to measure the rate of fluid flow is a turbine flow meter in which a turbine is caused to rotate in a passage through which the fluid is directed. The rate of rotation of the turbine is directly proportional to the velocity of fluid flow, and by measuring such rate of rotation, a flow rate indication may be obtained.

One application for fluid flow meters which provide a measure of the mass rate of fluid flow is in automotive air flow sensors for fuel control systems. In these applications, the rotating turbine design has the disadvantage of having relatively high inertia such that the response time of such rotating turbine flow meters is inadequate, particularly in view of the great range of the rates of air flow encountered in such applications.

One variation of the turbine type flow meter is the "stalled" turbine flow meter in which a rotor is provided with turbine blades and is disposed in the fluid flow passage and mounted for only a limited degree of angular displacement. The turbine rotor being restrained, reactive forces are created by the imposition of a change of angular momentum on the fluid flowing across the turbine blades. The reactive force is measured by a transducer in order to produce a signal corresponding to the fluid flow.

The restraining of the turbine allows a relatively rapid response time since the inertia is much less than the turbine rotating.

In co-pending U.S. Pat. No. 4,186,602, issued Feb. 5, 1980, assigned to the assignee of the present application, there is disclosed such a mass rate flow meter. In this design, temperature and pressure sensors are provided in addition to the reactive force measuring sensor so as to provide a signal corresponding to the fluid density, such that the mass rate of fluid flow can be computed from the flow rate and density signals.

In this design, the turbine blades are configured to receive substantially the entire fluid flow thereacross such as to provide a high degree of accuracy.

However, a characteristic of fluid flow and the forces generated by the change in momentum of the fluid is that the reactive force generated by the air flow corresponds to the square of second power of the air flow velocity. This nonlinear relationship produces relatively poor response at very low air flow rates and requires flow meters having relatively great ranges since the rate of air flow varies drastically, i.e., a 20:1 air flow range requires a force sensing transducer with a 400:1 output signal range.

A transducer of this range with good resolution in the lower force ranges is technically very difficult to achieve.

A poor response at low air flow rates, on the other hand, is very disadvantageous since the fuel control is more critical due to emission requirements, i.e., the management of fuel to the engine must be carefully controlled at low air flow rates in order to maintain emissions within desired or legal limits.

Accordingly, it is an object of the present invention to provide a turbine type flow meter in which the relationship between the reactive force acting on the stalled turbine and the rate of air flow is more linear with respect to each other such that for increasing air flow, the reactive forces are increased only moderately with increasing air flow.

It is another object of the present invention to provide a stalled turbine type flow meter in which the range of reactive forces which must be sensed by the force transducer is greatly reduced such as to enable the use of relatively low cost transducers for measuring the reactive forces generated by the stalled turbine.

SUMMARY OF THE INVENTION

These and other objects of the present invention, which will become apparent upon a reading of the following specification and claims, are achieved by the use of a turbine type flow meter in which a turbine rotor is disposed in the fluid flow passage through which the fluid flow is to be measured passes. Turbine blades occupy a portion of the cross sectional area of the turbine passage such that a proportion of the fluid flowing through the passage is intercepted by the turbine blades and the blades are curved so that an angular momentum change is imposed on the turbine rotor by passage of the fluid flow along the turbine blades.

The turbine is mounted for a limited excursion in response to the fluid flow therethrough against a bias force and the reactive forces are measured with a displacement transducer such as a potentiometer. Electrical signals corresponding to the excursion of the rotary turbine are thereby generated to thus provide signals corresponding to the average velocity of fluid flow through the fluid flow passage.

The turbine bias force is created by a coil spring resisting the angular displacement thereof such that the rotary position of the turbine blade corresponds to a reaction force generated by the fluid flowing through the passage.

In order to offset the second power relationship between fluid flow and the reactive forces generated on the stalled turbine rotor, a shielding stator is mounted immediately upstream of the stalled turbine blade elements and has blade elements oriented with respect to the turbine blade elements such as to intercept a portion of the fluid flow in the passage diverting it away from the turbine rotor blades so as to modify the increase in the reactive force with increasing rates of air flow.

This thereby produces a more linear relationship between the reactive forces and the flow rate, which in turn allows good sensitivity at very low air flow rates to be realized for the automotive applications described. In addition, this allows the use of relatively low cost transducers such as a simple potentiometer for measuring the reaction forces, i.e., as by a potentiometer providing electrical output signals corresponding to the angular position of the turbine rotor.

The fluid flow meter may also provide a mass rate of flow output signals by the additional provision of sensors enabling the density of the fluid to be measured as by pressure and temperature sensors located downstream of the turbine.

DESCRIPTION OF THE DRAWINGS

FIG. 1 is a cross sectional view of a turbine type flow meter according to the present invention together with a schematic representation of the associated sensors and computation circuitry.

FIG. 2 is an endwise view of the stalled turbine type flow meter depicted in FIG. 1.

FIG. 3 is a developed view of the turbine rotor and shielding stator depicting the relationship between the shielding stator blades and the turbine rotor blades with respect to fluid flow through the fluid flow meter depicted in FIGS. 1 and 2.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

As developed above, the concept according to the present invention consists of an arrangement of a stalled turbine type fluid flow meter in which a turbine rotor is provided having one or more turbine blades adapted to receive a portion of the fluid flow within a fluid flow passage in which is mounted the turbine rotor.

The turbine blade configuration is curved, preferably helically, such as to impress an angular momentum change on the fluid flowing across the blade, which change in angular momentum results in a reaction force acting on the turbine rotor which is proportional to the momentum of the fluid flowing in the fluid flow passage, i.e., corresponds to the fluid flow velocity.

According to the concept of the present invention, there is provided a means for changing the proportion of fluid flow impinging on the turbine rotor blades such that with increasing flow rates, a decreasing proportion of the total flow through the passage acts on the turbine rotor to offset the increase in reaction force with increasing rates of fluid flow due to the squared relationship between the reactive force and the rate of fluid flow thereby allowing a high degree of sensitivity of the flow meter for relatively low fluid flow rates and enable the use of wide range, relatively low cost reactive force measuring transducers.

Referring to the drawings, the specific means whereby these functions are contemplated as being achieved may be appreciated and understood.

The fluid flow meter 10 includes a tubular housing 12 and, as installed in a typical automotive application, the device may be disposed within an air cleaner. Mounted within the circular section fluid flow passage defined by the tubular housing 12 is a shielding stator 14 and a turbine rotor 18. The shielding stator 14 is fixed with respect to the tubular housing 12 by a plurality, i.e., two, opposed stator blades 20, affixed to a central turbine stator hub 22 on the inside edge and to the interior of tubular housing 12 on the outside edge.

The turbine rotor 18 in turn is rotatably mounted on a hub projection 24 extending from the stator hub 22, by means of sleeve bearings 26 which are preferably silicone greased in order to introduce mechanical damping to reduce the oscillations of the turbine rotor 18.

Bias force means are provided resisting the angular movement of the turbine rotor 18 in response to the reactive torque generated by the fluid flow, which means comprises a coil spring 28 affixed at its outside edge to the interior of the turbine rotor 30 portion of the turbine rotor 18 and to the hub projection 24 of the stator hub 22.

The turbine rotor 18 includes a number of helically curved turbine blades 32 corresponding to the number of stator blades and are affixed to the turbine rotor 30 which will impress a change in angular momentum on the fluid flowing thereacross.

In order to provide an output signal corresponding to the angular position of the turbine rotor 18, a potentiometer shaft 34 is provided affixed to the turbine rotor 30 and extending through the interior of the hub projection 24 and to a potentiometer 36 generates an electrical output signal corresponding to the angular position of the turbine rotor 18.

As can thus be seen by examination of FIGS. 2 and 3, the position of corresponding stator blades 20 and turbine blades 32 is such that the turbine blades 32 are positioned angularly just ahead of the stator blades 20 with the turbine rotor 18 in the normal relaxed position such that as the turbine blades 32 are angularly advanced by fluid flow passing thereover, an increasing shielding or shadowing of the turbine blades 32 is created by moving behind the corresponding stator blades 20.

The proportion of shielding is controlled by the shape and size of the stator shield vane 20 such as to produce a linearizing effect on the relationship between angular deflection of the turbine rotor 18 and air flow. That is, the shielding effect will reduce the proportion of the total air flow which is received by the turbine blades 32 with increasing air flow.

An electrical output signal corresponding to the angular position of the turbine rotor 18 is passed through a suitable position detector circuit 38, the output of which is transmitted into a computation circuit.

In the computation circuit 40, the mass rate of air flow may be computed by additional signals corresponding to the density of the fluid including a pressure sensor 42 and a temperature sensor 44, as described in the above-cited patent application.

The relationship between the mass rate of air flow and the downstream pressure and temperature conditions is fully developed in the above-referenced patent application, and from which an output signal may be generated corresponding directly to the mass rate of air flow.

Computation circuit 40 may also take into account the particular blade and flow proportion geometry in producing a direct output signal corresponding to the flow rate or mass rate of flow for each angular position of the turbine rotor 18.

The utilization device such as an electronic fuel control system 46 may then receive the final corresponding output signal for use in the system.

As also developed in the above-referenced patent application, the reactive force may also be directed in an axial direction and appropriate means provided to sense the same.

It should also be understood that other means for creating the change in proportion of air flow received by the turbine blades with increasing or varying air flow rates can be incorporated, rather than the angular system described.

It will further be appreciated that the air flow sensor according to the present invention differs from that of the above-referenced patent application in that the total flow in the passage may inherently not be received by the turbine blades, i.e., the diversion of a partial flow or portion of the flow within the passage within the turbine rotor precludes the passing of the entire flow over the turbine blades. This accordingly represents a potential source of inaccuracy, but this disadvantage is more than offset by the improved linearity and low air flow rate response capability and the reduced excursion ranges of reactive forces which must be measured by the transducing arrangement.

Other transducing arrangements may also be employed as an alternative to the potentiometer, but this latter approach offers the advantage of being of relatively low cost. As noted, this is made possible by the relatively reduced force range resulting from the diversion at higher air flow rates of an increasing proportion of the total fluid flow.

The present arrangement also offers the advantage of simplicity and reliability, rendering it suitable for use in the automotive environment.

The embodiments of the invention in which an exclusive property or privilege is claimed are defined as follows:

1. A stalled turbine flow meter comprising:
   a housing having an internal bore defining a fluid flow passage;
   a turbine rotor;
   means mounting said turbine rotor within said housing, said turbine rotor including at least one turbine blade configured to receive a portion of fluid flowing through said passage and to impose an angular momentum change on fluid flowing through said passage and over said at least one turbine blade developing a reaction force thereon;
   bias means allowing predetermined angular displacement of said turbine rotor in response to development of said reaction force for biasing said turbine rotor against said angular displacement in response to development of said reaction force;
   means varying the proportion of fluid flow directed over said at least one turbine blade with changing rates of fluid flow in said flow passage, including at least one shielding stator blade fixedly mounted within said fluid flow passage and disposed angularly offset from said at least one turbine rotor blade positioned such that said turbine rotor blade is advanced into alignment with said stator blade with increasing fluid flow and causing a lesser rate of increase in said reaction force resulting from increases in fluid flow; and
   means producing an output signal corresponding to said reaction force on said turbine rotor and said signal varying in a linear relationship with fluid flow.

* * * * *